Sept. 16, 1941.   J. W. SHEPERDSON   2,256,176
SHEARING ELONGATED MATERIAL
Filed Sept. 11, 1940   3 Sheets-Sheet 1

INVENTOR
JOHN W. SHEPERDSON
BY Albert G. Blodgett
ATTORNEY

Sept. 16, 1941.    J. W. SHEPERDSON    2,256,176
SHEARING ELONGATED MATERIAL
Filed Sept. 11, 1940    3 Sheets-Sheet 2

INVENTOR
JOHN W. SHEPERDSON
BY Albert G. Blodgett
ATTORNEY

Patented Sept. 16, 1941

2,256,176

UNITED STATES PATENT OFFICE 2,256,176

SHEARING ELONGATED MATERIAL

John W. Sheperdson, Worcester, Mass., assignor to Morgan Construction Company, Worcester, Mass., a corporation of Massachusetts Application September 11, 1940, Serial No. 356,239

20 Claims. (Cl. 164—66)

This invention relates to the shearing of elongated material, such as the metal bars or strip delivered by a rolling mill, and more particularly to the shearing of such material transversely into predetermined lengths.

It is one object of the invention to provide an improved shear of the rotary type which will be comparatively simple and inexpensive to manufacture and thoroughly dependable in operation.

It is a further object of the invention to provide a novel and advantageous shearing mechanism including a driving element arranged to rotate continuously and a shearing element arranged to be brought into action at intervals by the driving element.

It is a further object of the invention to provide a shearing apparatus having a simple and reliable mechanism for accelerating the shear blades to substantially the speed of the stock and thereafter bringing them to rest.

It is a further object of the invention to provide a simple and dependable shearing apparatus arranged to make cuts alternately on two longitudinally traveling bars of material.

It is a further object of the invention to combine with a shearing apparatus a novel stock switching and guiding mechanism whereby cuts may be made alternately on two longitudinally traveling bars of material, and the pieces cut from the said bars may be directed into two separate paths of delivery.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a rear elevation of a shearing apparatus, with certain switching and guiding mechanism removed therefrom;

Figure 3:
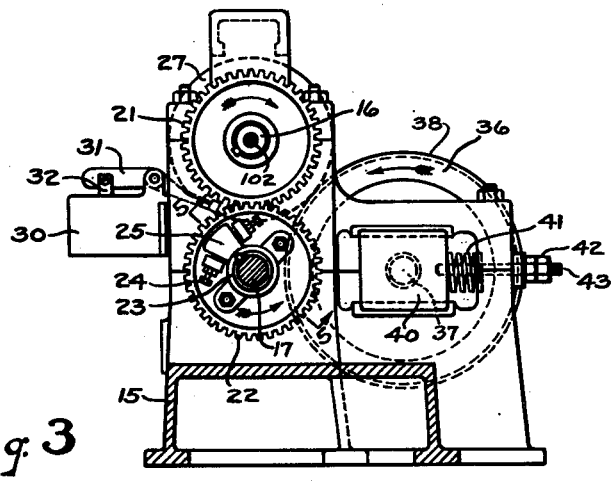
Fig. 3 is a section on the line 3—3 of Fig. 1.
Figure 5:
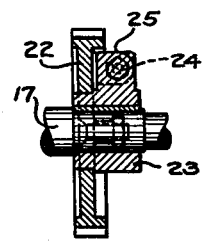
Fig. 5 is a section on the line 5—5 of Fig. 3.

The embodiment illustrated comprises a frame 15 in which are rotatably mounted an upper horizontal shaft 16 and a lower horizontal shaft 17. These shafts are parallel and they carry shear blades 18 and 19 respectively which are arranged to meet at each rotation of the shafts and thereby sever any material which may be traveling between them. The upper shaft 16 carries a gear 21 on one end, and the lower shaft 17 carries a gear 22 on the corresponding end, these gears intermeshing and having the same diameters so that the two shafts will rotate at the same speed. The lower gear 22 is mounted on a hub 23 (Figs. 3 and 5) keyed to the shaft 17, the gear being angularly adjustable on the hub by means of screws 24 which engage a lug 25 thereon, whereby a proper relative positioning of the shear blades may be obtained.

Releasable locking means is provided whereby the shear may be held against rotation between successive cuts. For this purpose a disk 27 is mounted on the upper shaft 16, this disk having a notch 28 in its periphery to form a shoulder for engagement with a latch 29 pivotally supported on a bracket 30 secured to the frame 15. This latch is provided with an arm 31 connected to the plunger 32 of a solenoid 33 mounted on the bracket 30, these parts being so constructed and arranged that the latch will be released by energization of the solenoid, and upon deenergization of the solenoid the latch will be returned by gravity to its operative position.

Figure 2:
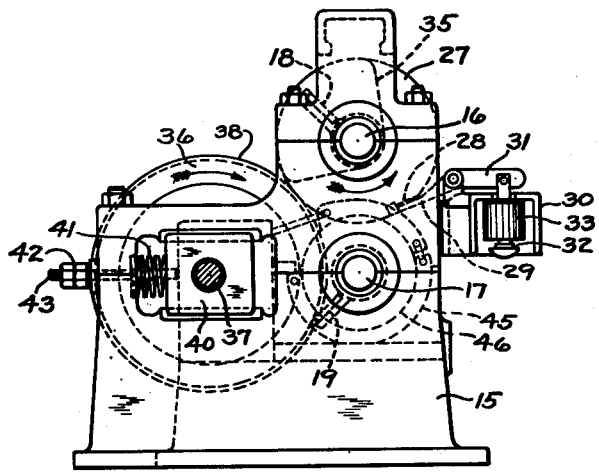
Fig. 2 is a side elevation of the shearing apparatus, as indicated by the line 2—2 of Fig. 1.
Figure 4:
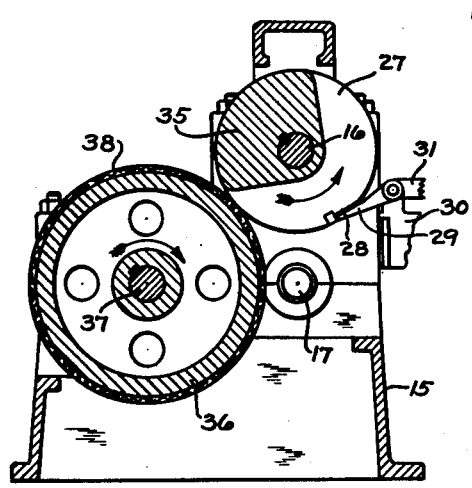
Fig. 4 is a section on the line 4—4 of Fig. 1.

Power for operation of the shear is transmitted through a novel friction driving mechanism. This mechanism includes a driven element in the form of a sector 35 secured to the upper shaft 16 adjacent the disk 27, and a driving element in the form of a wheel or pulley 36 secured to a horizontal shaft 37 parallel with the shear shafts. Preferably the peripheral surface of the wheel 36 is formed by a layer 38 of a suitable wear-resisting friction material, such as brake lining. As shown particularly in Fig. 4, when the latch 29 is engaged, the sector 35 extends to one side of the shaft 16 and above the wheel 36, with a slight space between the wheel and the lower corner of the sector. Thus upon release of the latch the sector will swing downwardly by its own weight into contact with the friction material 38 on the wheel. The shaft 37 is driven continuously by a suitable source of power. Consequently as soon as the sector 35 engages the wheel 36, the shear will be very rapidly accelerated, and before the shear blades reach the stock they will have attained a velocity substantially equal to that of the stock, so that a smooth cut will be made. In order to ensure adequate driving pressure between the wheel and the sector, the shaft 37 is carried by bearings 40 (Figs. 2 and 3) which are slidably mounted in the frame 15 and urged horizontally toward the shear shafts by means of springs 41. The sliding movement of the bearings is limited by adjustable nuts 42 carried by studs 43 extending from the bearings.

Figure 10:
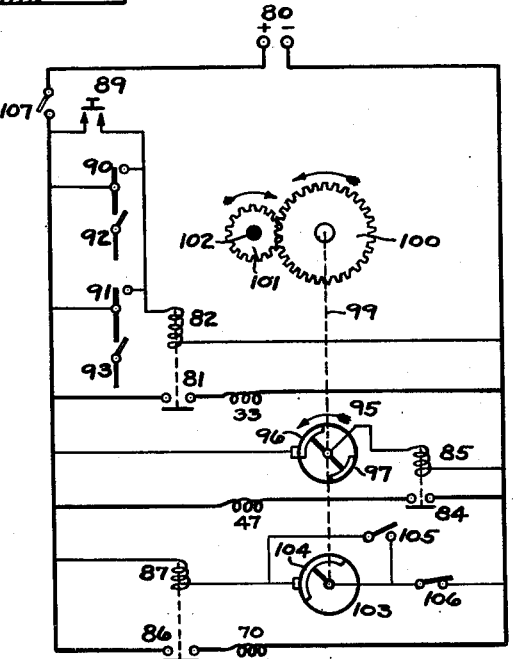
Fig. 10 is an electrical wiring diagram.
Figure 6:
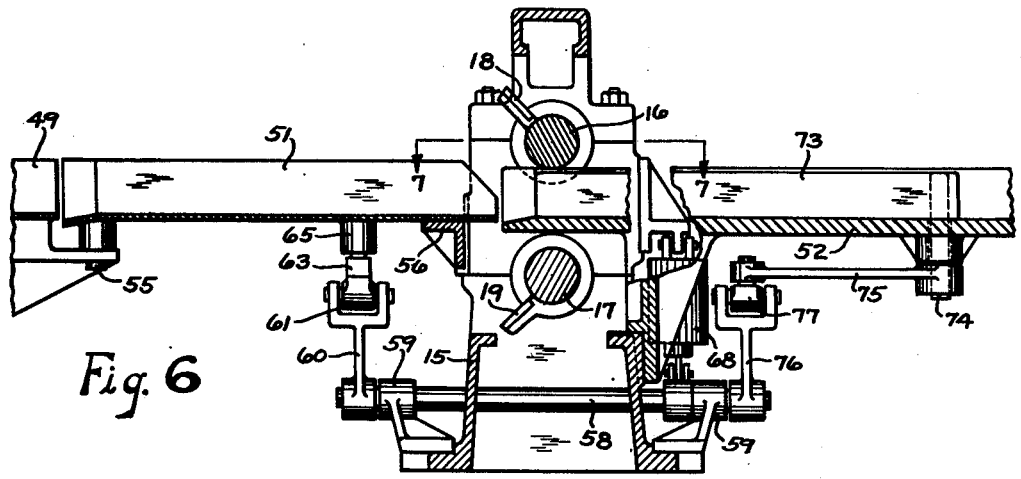
Fig. 6 is a section through the shearing apparatus with the switching and guiding mechanism added thereto, the section being taken on the line 6—6 of Fig. 7.

The arcuate length of the sector 35 is such that it will remain in contact with the wheel 36 until the shear has been accelerated to full speed and the cut has been completed, whereupon the continued rotation of the sector will carry it out of contact with the wheel. At this time a decelerating force is applied to the shear so that it may be brought to rest against the latch at the completion of one revolution without excessive shock. In the embodiment illustrated this deceleration is brought about by means of a friction band brake 45 (Figs. 1 and 2) arranged to engage a drum 46 on the lower shear shaft 17. This brake is of a well known type having a spring (not shown) to apply the same, the brake being released by energization of a solenoid 47 (Fig. 10).

Referring now to Figs. 6 to 9 inclusive, it will be seen that means is provided to deliver two parallel strands of material to the shearing apparatus, this means including a guideway 49 leading from a rolling mill (not shown), and two laterally adjacent switch troughs 50 and 51 located between the guideway 49 and the shear. A receiving trough 52 is located beyond the shear. The front or inlet end of the trough 52 extends between the shafts 16 and 17, this portion of the trough having a central notch 53 therein to avoid interference with the shear blades 18 and 19. The switch troughs 50 and 51 are pivotally secured to the guideway 49 by means of vertical pins 55, and the rear portions of these troughs rest slidably upon a transverse bar 56 carried by the frame 15. By swinging both troughs to the right and to the left, the two strands of material will be moved alternately into the path of the shear blades.

The troughs 50 and 51 are preferably shifted by a suitable power-actuated mechanism, and for this purpose a horizontal shaft 58 is mounted in bearings 59 carried by the frame 15, this shaft extending in a longitudinal direction beneath the shear blades. On the front end of the shaft there is secured an upright arm 60 having a member 61 pivoted thereon, this member having a pin 62 which extends upwardly therefrom into a recess in a transverse bar 63. The bar 63 is provided with pins 64 which extend upwardly from its opposite ends into recesses in bosses 65 depending from the troughs 50 and 51. This construction provides a universal or swivel connection whereby the guide troughs may be swung laterally by rocking the shaft 58 in its bearings. This rocking motion is brought about through the medium of an arm 67 extending laterally from the shaft and a suitable reciprocating motor 68 connected to the outer end of the arm. This motor is actuated by fluid supplied under pressure from a suitable source under the control of a four-way valve 69 illustrated diagrammatically in Fig. 9. This valve may be of any suitable type, and is shown arranged to be moved in one direction by a solenoid 70 and in the reverse direction by a spring 71.

Figure 7:
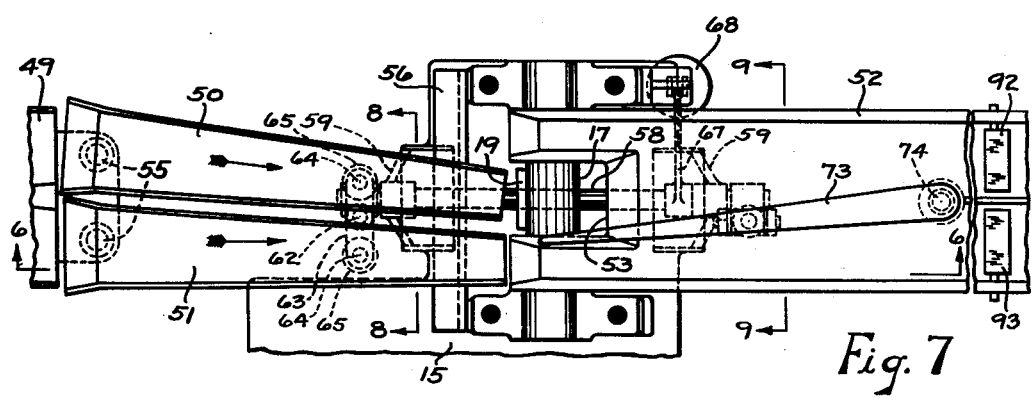
Fig. 7 is a plan view of the apparatus, with certain parts removed for clearness of illustration.
Figure 8:
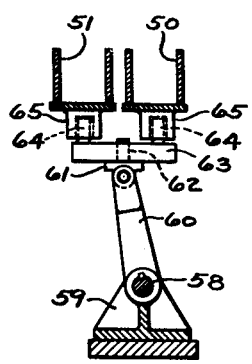
Fig. 8 is a section on the line 8—8 of Fig. 7.
Figure 9:
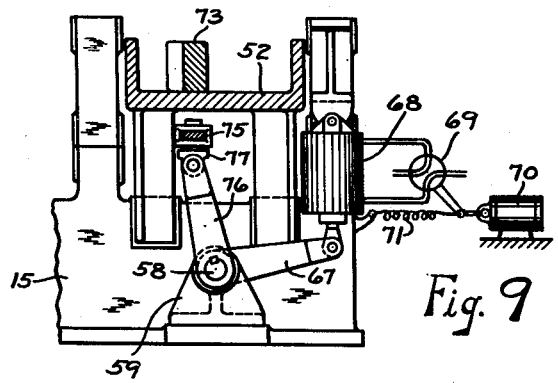
Fig. 9 is a section on the line 9—9 of Fig. 7.

Ordinarily it will be important to direct the bars of stock, which are delivered through the respective troughs 50 and 51, into separate paths. For example, in many installations these bars may be forwarded to opposite sides of a double cooling bed. It will be noted however that when the trough 50 is swung to the right and into line with the shear blades, as shown in Fig. 7, this trough will direct the stock at an angle leading toward the opposite side of the receiving trough 52. The same will be true of the trough 51 when the troughs are swung to the left. In order to prevent any crossing or tangling of the bars issuing from the respective switch troughs, there is provided a switch blade 73 which is located within the receiving trough 52 and rests upon the bottom thereof. The rear end of this blade is secured to a vertical pin 74 which extends downwardly through the bottom of the trough 52, and the front end of the blade extends forwardly close to the rear ends of the switch troughs and in a position to separate the two strands issuing from them. In order that this separation of the strands may be maintained at all times, and in order that the switch blade may be prevented from interfering with the desired lateral swinging of the stock into the path of the shear blades, the switch blade is moved laterally to the opposite side of the shear blades whenever the switch troughs are reversed. For this purpose a forwardly extending arm 75 is secured to the lower end of the pin 74, and an upright arm 76 is secured to the rear end of the shaft 58. The upper end of the arm 76 is connected to the front end of the arm 75 by means of a swivel member 77. With this construction the motor 68 serves to swing the guide troughs 50 and 51 and the switch blade 73 simultaneously.

Figure 1:
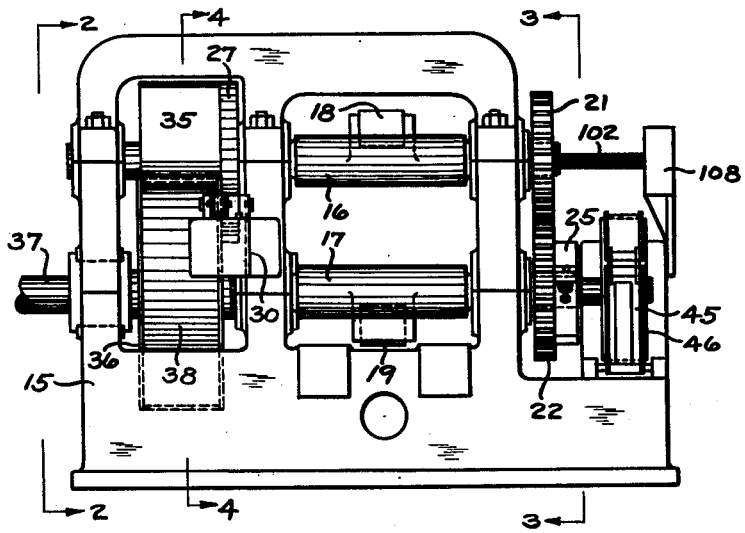

The motor 68, the latch 29 and the brake 45 are preferably all controlled automatically so that pieces of a predetermined length will be cut from the two strands of material alternately. For this purpose certain electrical switches are provided, as indicated diagrammatically in Fig. 10, to control the flow of electricity from a suitable source 80 to the three solenoids heretofore mentioned. The latch solenoid 33 is connected in series with a normally open relay 81 having an actuating coil 82, the brake solenoid 47 is connected in series with a normally open relay 84 having an actuating coil 85, and the valve solenoid 70 is connected in series with a normally open relay 86 having an actuating coil 87. The energization of the coil 82 is controlled by a push button 89 and two switches 90 and 91 of the momentary contact type, the push button and switches being connected in parallel. The switches 90 and 91 are provided with pivotally mounted actuators 92 and 93 respectively, located in the path of stock beyond the shear, as indicated in Fig. 7. The actuator 92 is in the path of the left-hand strand and the actuator 93 is in the path of the right-hand strand, the arrangement being such that whenever the front end of a piece of stock reaches the corresponding actuator, the latter will swing about its pivot and close the associated switch momentarily. The energization of the coil 85 is controlled by a rotary switch 95 having two arcuate contact members 96 and 97 located in diametrically opposite positions, this switch being driven by a shaft 99 from a gear 100, the latter being connected by a pinion 101 and shaft 102 to the upper shaft 16 of the shear. The gear 100 has twice as many teeth as the pinion 101, so that the switch 95 will make one-half a revolution for each revolution of the shear. The energization of the coil 87 is controlled by a rotary switch 103 having a single arcuate contact member 104 driven by the shaft 99, this switch being connected in parallel with a manually operable switch 105 and in series with a manually operable switch 106. In the usual operation of the apparatus the switch 105 will be open and the switch 106 closed. A main switch 107 is provided for the source of power 88. As indicated in Fig. 1, the rotary switches and their driving gears may be enclosed in a suitable housing 108.

The operation of the invention will now be apparent from the above disclosure. With the main switch 107 closed, and the rolling mill delivering two strands of material to the switch troughs 50 and 51 respectively, assuming that the parts are positioned as shown in Fig. 7, the left-hand strand will travel between the shear blades, and the right-hand strand will travel to the right of the shear blades. As the front end of the left strand strikes the actuator 92, the switch 90 will be closed momentarily, energizing coil 82, closing relay 81, and momentarily energizing the latch solenoid 33. This will release the latch 29, and the weight of the sector 35 will cause it to drop into contact with the wheel 36, which is driven continuously. The pressure between these parts will cause the wheel 36, with its shaft 37 and bearings 40, to yield slightly in a horizontal direction against the springs 41, which will nevertheless maintain a pressure sufficient to ensure very rapid acceleration of the shear by reason of the tangential force applied frictionally by the wheel to the sector. Preferably acceleration will be completed before the shear blades engage the stock, the speed of the shaft 37 being such that the velocity of the blades will be substantially equal to that of the stock. The left-hand strand will thus be severed, and as the cut is completed the sector 35 will leave the wheel 36. At approximately the same instant the contact member 96 will break the circuit through the coil 85, so that the relay 84 will open and the brake coil 47 will be deenergized. The brake 45 will thereupon engage its drum 46, and the shear will be decelerated. During this deceleration period the contact member 104 will break the circuit through the coil 87, opening the relay 86, and deenergizing the solenoid 70. This will allow the spring 71 (Fig. 9) to reverse the valve 69, admitting pressure fluid to the upper end of the motor 68, lowering the arm 67 and thereby swinging the troughs 50 and 51 and the switch blade 73 to the left. This will bring the right-hand strand between the sheer blades. Just before the notch 28 reaches the latch 29, the contact member 97 will close the circuit through the coil 85, so that the relay 84 will close and the brake solenoid 47 will be energized, releasing the brake 45. By this time the shear will have lost most of its velocity, and it will come to rest against the latch 29 without serious shock. The shear will now remain stationary until the front end of the right-hand strand strikes the actuator 93, closing the switch 91 momentarily and energizing the coil 82. This will close the relay 81, energize the latch solenoid 33, and release the latch, thereby starting another cutting cycle of the shear and severing the right-hand strand. At the completion of the cut the brake will be applied by the action of the contact member 97 in opening the circuit through the coil 85, and the contact member 96 will close this circuit and release the brake just before the notch 28 reaches the latch 29. In the meantime the contact member 104 will close the circuit through the coil 87, energizing the valve solenoid 70 and returning the valve 69 to the position shown in Fig. 9. This will admit pressure fluid to the lower end of the motor 68 and exhaust fluid from the upper end thereof, whereby the switch troughs 50 and 51 and the switch blade 73 will be returned to the position shown in Fig. 7. The shear will thus continue to make cuts on the right and the left-hand strands alternately. The lengths of the several pieces may be changed by moving the switch actuators toward or away from the shear. It will be understood that for these actuators to operate properly there should be a gap between each severed piece and the following front end. Such a gap will be obtained in known manner by adjusting the speed of the cooling bed runon table to a velocity somewhat greater than that of the stock approaching the shear. It will also be understood that billets will be delivered to the two pass lines of the rolling mill in such a time relationship as to afford proper intervals between the cuts on successive strands, since the shear must have an opportunity to complete one revolution before it is called upon to sever the opposite strand. The maintenance of this relationship will be a simple matter when cutting comparatively long lengths for a cooling bed.

The push button 89 provides a means whereby the operator may initiate a revolution of the shear at any time, regardless of the position of the front end of the stock, since the momentary closing of this button has the same effect as the momentary closing of the switches 90 or 91. By closing the switch 105, the operator may prevent the automatic reversal of the guide troughs and thus operate the apparatus single strand if desired. This can be either a right-hand or a left-hand strand, dependent upon whether the switch 106 is open or closed, since this switch will control the relay 86 and the energization of the valve solenoid 70. With the switch 105 closed to prevent switching of the stock, the operator may cut a short sample length from any desired portion of either strand simply by depressing the push button 89 long enough for the shear to make two successive cuts in rapid succession.

It will be apparent that the invention provides a highly advantageous shearing apparatus, which will be comparatively simple and inexpensive to manufacture. Since the driving wheel 36 rotates continuously, the control of the shear speed at the time of cut is a very simple matter. When used in conjunction with a mill rolling two strands, both of which require shearing into predetermined lengths, the invention makes it possible to eliminate one of the two separate shears heretofore required.

Having thus described my invention, what I claim as new and desire to secure by Letters Patent is:

1. Apparatus for shearing elongated material comprising a wheel arranged to be rotated continuously about its axis and provided with a peripheral surface in the form of a circle, a member rotatable about an axis parallel with the wheel axis and shaped to provide an outer surface in the form of a circular arc, means to bring said surfaces into mutual contact and thus cause the wheel to drive said member through a portion of a revolution by frictional engagement therewith, a movable shear blade, and means connecting said member to the shear blade to actuate the same.

2. Apparatus for shearing elongated material comprising a wheel arranged to be rotated continuously about its axis and provided with a peripheral surface in the form of a circle, a member rotatable about an axis parallel with the wheel axis and shaped to provide an outer surface in the form of a circular arc, releasable means to hold the member stationary in a predetermined position with the said surfaces out of contact, the member being biased to turn about its axis when said means is released and thereby bring the arcuate surface of the member into frictional engagement with the revolving peripheral surface of the wheel, a movable shear blade, and means connecting said member to the shear blade to actuate the same.

3. Apparatus for shearing elongated material comprising a wheel arranged to be rotated continuously about a horizontal axis, a sector rotatable about an axis parallel with the axis of the wheel, releasable means to hold the sector stationary in a predetermined position out of contact with the wheel, the sector extending to one side of its axis when in said position and arranged to swing downwardly by gravity into frictional engagement with the wheel upon release of said means, a movable shear blade, and means connecting said sector to the shear blade to actuate the same.

4. Apparatus for shearing elongated material comprising a wheel arranged to be rotated continuously about its axis and provided with a peripheral surface in the form of a circle, a member rotatable about an axis parallel with the wheel axis and shaped to provide an outer surface in the form of a circular arc, a movable shear blade, means connecting said member to the shear blade to actuate the same, means to bring the said surfaces into contact and thus cause the wheel to drive the member through a portion of a revolution by frictional engagement therewith, the various parts being so constructed and arranged that the shear blade will pass through its cutting position during the said portion of a revolution, and means to decelerate the member after the said surfaces have moved out of contact and bring it to rest at the completion of one revolution.

5. Apparatus for shearing elongated material comprising a wheel arranged to be rotated continuously about its axis and provided with a peripheral surface in the form of a circle, a member rotatable about an axis parallel with the wheel axis and shaped to provide an outer surface in the form of a circular arc, yieldable means urging the wheel laterally toward the member, means limiting the lateral movement of the wheel, releasable means to hold the member stationary in a predetermined position with the said surfaces out of contact, the member being biased to turn about its axis when the said releasable means is released and thereby bring the arcuate surface of the member into frictional engagement with the revolving peripheral surface of the wheel with the said surfaces held in firm contact by said yieldable means, a movable shear blade, and means connecting said member to the shear blade to actuate the same.

6. Apparatus for shearing elongated material comprising a wheel arranged to be rotated continuously about its axis and provided with a peripheral surface in the form of a circle, a member rotatable about an axis parallel with the wheel axis and shaped to provide an outer surface in the form of a circular arc, a movable shear blade, means connecting the member to the shear blade to actuate the same, releasable means to hold the member stationary in a predetermined position with the said surfaces out of contact, the member being biased to turn about its axis when said means is released and bring the said surfaces into contact, thereby causing the wheel to drive the member through a portion of a revolution by frictional engagement therewith, the various parts being so constructed and arranged that the shear blade will pass through its cutting position during the said portion of a revolution, and a friction brake arranged to decelerate the member after the said surfaces have moved out of contact, the releasable means being arranged to stop the rotation of the member at the completion of one revolution.

7. Apparatus for shearing elongated material comprising a pair of cooperating rotary shear blades, a continuously running driver, means to transmit power from the driver to the shear blades by friction to accelerate said blades from a stationary position and cause them to pass through their cutting position, and friction braking means arranged to decelerate the blades after the cut has been completed.

8. Apparatus for shearing elongated material comprising a pair of cooperating rotary shear blades, a wheel arranged to be rotated continuously about its axis and provided with a peripheral surface in the form of a circle, a member rotatable about an axis parallel with the wheel axis and shaped to provide an outer surface in the form of a circular arc, means connecting the member to the shear blades to actuate the same, and means to bring said surfaces into mutual contact and thus cause the wheel to drive the member through a portion of a revolution by frictional engagement therewith.

9. Apparatus for shearing elongated material comprising a frame, two parallel shafts rotatably mounted therein, two cooperating shear blades secured to the shafts respectively, the blades being comparatively narrow so that a strand of material may pass on either side thereof without interference with the frame, means to deliver two strands of material in separate paths of travel adjacent to the blades, and means to move the strands laterally and bring them alternately between the blades.

10. Shearing apparatus comprising a rotatable shear blade, means to deliver two strands of elongated material in separate paths of travel adjacent to the blade, and means to effect a relative shifting of the blade and strands in a lateral direction so that the strands will alternately lie in the path of the blade.

11. Shearing apparatus comprising a movable shear blade, means to deliver two strands of elongated material in separate paths of travel adjacent to the blade, and means to move said strands laterally and bring them alternately into the path of the blade.

12. Shearing apparatus comprising a movable shear blade, means to deliver two strands of elongated material in separate paths of travel adjacent to the blade, and means to move said strands simultaneously to the right and then to the left to bring the strands alternately into the path of the blade.

13. Shearing apparatus comprising two cooperating rotary shear blades, means to deliver two strands of elongated material in separate approximately parallel paths of travel adjacent to the blades, and means to move said strands laterally and bring them alternately between the blades.

14. Shearing apparatus comprising a movable shear blade, means to deliver two strands of elongated material in separate paths of travel adjacent to the blade, means to move said strands laterally and bring them alternately into the path of the blade, and means located beyond the blade to direct the issuing strands into separate paths.

15. Shearing apparatus comprising a movable shear blade, means to deliver two strands of elongated material in separate paths of travel adjacent to the blade with one strand passing through the path of the blade and the other strand passing to one side thereof, and means to shift the strands laterally to bring the said one strand to the other side of the blade and the said other strand into the path of the blade.

16. Shearing apparatus comprising a movable shear blade, means to deliver two strands of elongated material in separate approximately parallel paths of travel adjacent to the blade, means to move said strands laterally and bring them alternately into the path of the shear blade, a switch blade located beyond the shear blade, and means to move the switch blade laterally in accordance with the lateral movement of the strands to maintain separation of the strands.

17. Shearing apparatus comprising a movable shear blade, guide means in front of the blade to direct two strands of elongated material in separate approximately parallel paths of travel adjacent to the blade, means to shift the guide means laterally and bring the strands alternately into the path of the blade, a switch blade located beyond the shear blade, and means to move the switch blade laterally in accordance with the lateral movements of the guide means to maintain separation of the strands.

18. Shearing apparatus comprising a movable shear blade, guide means in front of the blade to direct two strands of elongated material in separate approximately parallel paths of travel adjacent to the blade, means to shift the guide means laterally and bring the strands alternately into the path of the blade, a receiving trough located beyond the blade, a switch blade mounted within the trough with its front end adjacent to the shear blade, and means to move the switch blade laterally in accordance with the lateral movements of the guide means to maintain separation of the strands as they enter the trough.

19. In combination with a shear for longitudinally traveling material, means to actuate said shear automatically at predetermined intervals and cut the material transversely into separate pieces, and manually controlled means to cause the shear to make two cuts in rapid succession and thereby sever a comparatively short sample length of the material.

20. In combination with a rotary shear for longitudinally traveling material, means to drive said shear automatically through single revolutions at predetermined intervals and cut the material transversely into separate pieces, the shear remaining stationary between successive revolutions, and manually controlled means to cause the shear to make two revolutions in succession without stopping and thereby sever a comparatively short sample length of the material.

JOHN W. SHEPERDSON.